3,642,760

POLYMERIZATION AND COPOLYMERIZATION OF DIOLEFINS

Paul Baekelmans and Emile Leblon, Brussels, Belgium, assignors to Solvay & Cie, Brussels, Belgium No Drawing. Filed Oct. 10, 1969, Ser. No. 865,483
Claims priority, application France, Oct. 14, 1968, 169,890; Sept. 9, 1968, 6930725; Sept. 23, 1969, 6932507
Int. Cl. C08d 3/06, 1/14, 3/04
U.S. Cl. 260—94.3 4 Claims

ABSTRACT OF THE DISCLOSURE

Diolefins are polymerized and copolymerized in the presence of a catalyst which is obtained by reacting a transition metal compound with a solid compound of a bivalent metal containing hydroxyl and/or oxygen groups or with a polymer which contains electron donor groups and then activating the thus obtained produce with an organometallic compound.

BACKGROUND OF THE INVENTION

The present invention is directed to a process for the polymerization and copolymerization of diolefins in the presence of solid supported catalysts.

It has been proposed previously to polymerize and copolymerize monoolefins in the presence of solid catalytic complexes obtained by associating solid supports with compounds of transition metals. These solid supports may be for example:

An inorganic phosphate wherein one or several hydroxyl groups is fixed on its molecule and/or which contains water of crystallization as disclosed in U.S. Pat. No. 3,214,417;

An hydroxychloride of a bivalent metal as disclosed in U.S. Pat. No. 3,400,110;

An vinyl alcohol copolymer comprising from 1 to 20 mole percent of vinyl alcohol in its molecule as disclosed in U.S. Pat. No. 3,396,155;

A hydroxylated polycondensate derived from formol and an aminated compound as disclosed in U.S. patent application Ser. No. 617,866, filed on Feb. 2, 1967;

A macromolecular compound containing carbon-carbon double bonds in its molecules as disclosed in U.S. patent application Ser. No. 617,598, filed on Feb. 21, 1967;

A nitrogeneous macromolecular compound substantially free of hydroxyl groups as disclosed in U.S. patent application Ser. No. 683,492, filed on Oct. 16, 1967;

A macromolecular compound comprising oxygenated functional groups but substantially free of alcoholic hydroxyl groups as disclosed in U.S. patent application Ser. No. 684,515, filed on Nov. 20, 1967;

An oxygenated compound of a bivalent metal substantially poor in hydroxyl groups, and particularly a salt of a carboxylic acid as disclosed in U.S. patent application 676,738, filed on Oct. 20, 1967;

A hydroxide of a bivalent metal as disclosed in U.S. patent application 790,832, filed on Jan. 13, 1969;

A partially hydrolyzed halogenide of a bivalent metal as disclosed in U.S. patent application Ser. No. 808,638, filed on Mar. 19, 1969;

An oxygenated compound of a bivalent metal which has undergone a halogenation treatment as disclosed in Belgian patent application 75,325, filed on June 13, 1969; and A compound of formula $X_{m-n}M(OR)_n$ where M is a metal of Groups I, II, and III, of the Periodic Table X is a halogen, R is a hydrocarbon radical, $m$ in the valence of M and $n$ is an integral number such that $1 \leq n \leq m$. Each of the above noted patents and patent applications is incorporated herein by reference.

SUMMARY OF THE INVENTION

It has now been discovered that catalyst composed of an activator and a compound of transition metal which has been chemically bound to a support may be used to polymerize and copolymerize diolefins.

According to the present invention, diolefins are polymerized and copolymerized in an anhydrous medium in presence of a catalyst comprising an organometallic compound and a catalytic complex. This complex is obtained by reacting, in the absence of a solvent or in an anhydrous hydrocarbon solvent, a compound of a transition metal selected from Groups IV*b*, V*b*, VI*b* and VIII of the Periodic Table and a solid support selected from the group comprising the compounds of bivalent metals containing hydroxyl groups and/or oxygen atoms and polymers containing electron donor functional groups.

DESCRIPTION OF THE PREFERRED EMBODIMENTS

The process according to the invention may be used to polymerize conjugated or non-conjugated diolefins and more particularly to manufacture homopolymers of butadiene, isoprene, pentadiene and copolymers of one diolefin with another one or with aliphatic monoolefins such as isobutene, ethylene and propylene, alicyclic monoolefins such as vinyl cyclohexane or vinyl aromatic monoolefins such as styrene.

The solid support is selected from the group comprising the compounds of bivalent metals containing hydroxyl groups and/or oxygen atoms and the plymers comprising electrondonor groups.

The compounds of bivalent metals may be hydrated and/or hydroxylated phosphates, hydroxychlorides, hydroxides, partially hydrolyzed halides, carbonates, sulphates, nitrates, silicates, salts of carboxylic acids and alcoholates. The bivalent metal is preferably selected from the group comprising magnesium, calcium, zinc, tin, manganese and iron.

The polymers containing electrondonor groups which are used as solid supports are preferably selected from polymers which have, either in the principal chain and/or on side chains, groups comprising election pairs which are able to form coordination bonds with the transition elements.

Such groups are for example:

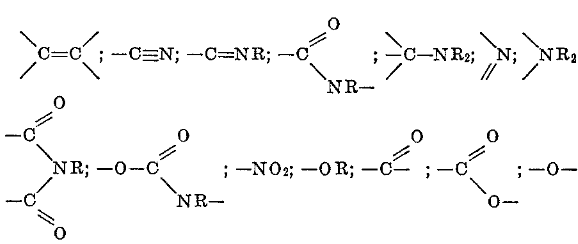

where R is a hydrogen atom or an alkyl, aryl, cycloalkyl, alkylaryl or arylalkyl radical.

Examples of polymers having these reactive groups are polybutadiene, poly-p-dimethylaminostyrene, polyvinylpyridine, polyvinylpyrrolidone, polycondensate derived from hexamethylene diamine and adipic acid, polycaprolactam, polycondensate derived from diphenyliso-cyanate and 1,4-dihydroxybutane, poly-p-nitrostyrene, polytetrahydrofuran.

Compounds of transition metals which may be used to prepare the catalytic complexes are selected preferably from the chlorides, the bromides, the iodides, the alkoxides and the chelates of titanium, zirconium, vanadium, chromium, molybdenum, iron, cobalt and nickel and most preferably from TiCl, $TiI_4$, $CoCl_2$, and $NiCl_2$.

By chelates, are meant generally the salts which are derived from 1,3-dicarbonyl or 1,3-ketocarboxylic compounds such as nickel acetylacetonate, cobalt (II) acetylacetonate and the corresponding acetoacetates.

The reaction between the solid support and the compound of a transition metal must be carried out in the absence of humidity. This reaction is preferably carried on at a temperature above the normal temperature; i.e., at about 40 to 180° C. A hydrocarbon solvent which is able to dissolve the transition metal compound may be used as a solvent. The reaction may be carried out also in the absence of solvent; the compound of the transition metal can be used as the dispersing medium when it is liquid at the reaction temperature. When a solvent is used, a solution of the compound of a transition metal may be mixed with the support or with a solution of the support. In this case, the solid catalytic complex is precipitated.

After the reaction, the solid catalytic complex is washed with an inert solvent, preferably with the solvent used for the reaction. The traces of the compound of a transition metal which are not bound to the support are in this way eliminated. Thus, the coordinative bonding between the supoprt and the compounds of a transition metal is completed, and the catalytic complex, i.e., transition metal compound chemically bound to a support, is then ready to be activated and to be used for polymerization.

The organometallic compound used for activating the catalyst is selected from the derivatives of metals of Groups I and III of the Periodic Table which have at least one metal-carbon bond. The trialkylaluminums and alkylaluminum halides are suitable and more particularly the dialkylaluminum iodides and chlorides. These compounds may be selected from derivatives which have a straight alkyl chain and those who have a branched alkyl chain. The alkyl chain may comprise from 1 to 18 carbon atoms. Among the suitable activators, triethylaluminum, triethylaluminum, tri-n-octylaluminum and diethylaluminum chlorides may be mentioned particularly. Other halides such as the dihalide and sesquihalides ofalkylaluminum compounds may also be used.

The amount of activator is not critical as long as the activator is in excess, and preferably in large excess, with respect to the compound of a transition metal which is present as part of the catalytic complex in the polymerization medium.

The molar ratio between the activator and the compound of a transition metal is generally comprised between 2 and 500 and preferably between 10 and 300. A larger amount of activator is not injurious but is generally of no special benefit.

Small amounts of water may be added to the catalyst. Generally the activity is then increased and the stereospecificity is not altered. The molar ratio of activating compound to water is usually comprised between 1 and 20, and preferably between 5 and 15.

The polymerization reaction is carried out by means of well known techniques such as in solution in an inert hydrocarbon solvent such as hexane, cyclohexane or benzene, or in bulk, the monomer acting as solvent or dispersing medium.

According to this invention a particular steric configuration of the polymer, i.e., cis or trans, 1,2; 3,4 or 1,4 may be obtained by proper selection of the constituents of the catalyst; i.e., activator, compound of a transition metal or support.

If for example it is desired to produce polybutadiene having predominantly or even almost entirely a trans-1,4 structure, a catalyst composed of the following constituents is employed.

The support is selected from compounds of bivalent metals and more preferably is a magnesium hydroxychloride, oxide or alcoholate.

The transition metal compound is a derivative of titanium, more preferably a halide including an iodide or an acetylacetonate.

The activator is a trialkylaluminum or a dialkylaluminum chloride.

On the other hand, polybutadiene with a high content of cis-1,4 units may be obtained by using a catalyst composed of the same supports and same transition metal compounds used to obtain a trans-1,4 structure but by employing an activator which is an alkylaluminum iodide or preferably a mixture of a trialkylaluminum and an alkylaluminum iodide.

The trialkylaluminums may be selected equally, from compounds which have straight alkyl chains and from compounds which have branched alkyl chains. The alkyl chain may have from 1 to 18 carbon atoms. Triethylaluminum, triethylaluminum and tri-n-octylaluminum are preferred.

The alkylaluminum iodide is selected from the alkylaluminum monoiodides and the alkylaluminum diodides but preferably from the alkylaluminum monoiodides which have 1 to 18 carbon atoms in straight or branched alkyl chains. Diethylaluminum iodide is particularly easy to obtain and is desirably used for this reason.

The preferred amount of each constituent in the mixture depends on the particular constituents thereof. However, the best results are obtained when a molar excess of alkylaluminum diodide with respect to trialkyaluminum is used. The excess is more important when a monoiodide is used than when a diiodide is used. In the first case, the molar ratio of $AlR_2I$ to $AlR_3$ is preferably comprised between 2 and 100 and most preferably between 5 and 20.

Whenever, a mixture of alkylaluminums is used, polymers with a high content of cis-1,4- units are obtained. This content may easily reach 60% and may even be above 80%. Polybutadiene polymers containing these proportions are good for most applications.

When polybutadienes with a very high content of cis-1,4 units are desired, a catalytic system based on a halide or a chelate of a metal Group VIII is selected. Each of these compounds may be used successfully with all the previously mentioned supports. However, the chelates are preferably used in combination with compounds of bivalent metals and the halide preferably with polymers comprising electroconductor groups.

When a halide or chelate of a metal of Group VIII is used as the active element bound to the support, the catalytic activity is increased to a great extent. The content of cis-1,4 units is high too; it may be as high as 80% and even exceed 90%. Such high contents of the cis-1,4 form are desirable for applications for which elastomers with a determined steric configuration are necessary.

EXAMPLE 1

A suspension of 5 g. of magnesium hydroxychloride [Mg(OH)Cl] in 25 ml. of pure $TiCl_4$ is heated to 130° C. and stirred for 1 hour. The solid is separated and transferred to the basket of an extractor of the Kumagawa type and is extracted for 1 hour with boiling $TiCl_4$. The solid is then washed with hexane until every trace of $TiCl_4$ not chemically bound is eliminated. A catalytic complex containing 4.0 g. of titanium per kg. is recovered.

An autoclave of 1.5 l. swept with pure dry butadiene is supplied successfully with:

106.1 mg. of triisobutylaluminum, 1.254 g. of the catalytic complex previously prepared and is closed. Then, 347 ml. of butadiene are injected into the autoclave and the temperature is raised to 55° C.

After 1.5 hours, the autoclave is cooled and 173 g. of butadiene are recovered. The conversion rate of butadiene is 80.5%. The catalytic activity is 22,800 g. of polymer per hour and per g. of transition metal. The recovered butadiene contains 89% of trans-1,4 units, 4% of cis-1,4 units and 7% of 1,2 units.

EXAMPLE 2

A catalytic complex based on titanium tetraiodide is manufactured by suspending 5 g. of Mg(OH)Cl in 100 ml. of a solution of 5 g. of $TiI_4$ in 1 l. of n-octane. The suspension is heated at 126° C. for 1 hour. After being separated, the solid is washed with hexane and dried.

The recovered catalytic complex contains 1.88 g. of titanium per kg.; 1.082 g. of this complex and 0.0912 g. of triisobutylaluminum are used to polymerize butadiene under the same conditions as those of Example 1.

After 4 hours of polymerization, 193 g. of 1,4-trans polybutadiene are recovered. The catalytic activity is 25,500 g. of polymer per hour and per g. of transition element. The conversion rate is 89.4%.

The product has the following stereochemistry: 1,4-trans 94%; 1,4-cis 0%; 1,2 6%.

EXAMPLE 3

The reaction between $TiCl_4$ and magnesium hydroxychloride is carried out in a round bottom flask of 0.5 l. on the top of which is mounted a tube provided with a double envelope having a sintered plate at its bottom and a cooling device at its top.

$TiCl_4$ in an amount of 300 ml. and 20 g. of Mg(OH)Cl are supplied to the flask. The double envelope is heated to 130° C. by oil circulation in order to effect the boiling of $TiCl_4$. By distillation and filtration through the sintered plate, $TiCl_4$ is passed through the Mg(OH)Cl support 5 times in about 1 hour and 45 minutes. Then the $TiCl_4$ is replaced by hexane and the thus obtained catalytic complex is washed 20 times with distilled hexane.

A catalytic complex is recovered having following composition:

| | G./kg. |
|---|---|
| Ti | 1.6 |
| Cl | 529 |
| Mg | 302 |

An autoclave of 1.5 l. is supplied under a current of nitrogen successfully with:

17 ml. of a solution of 1 mole of $Al(C_2H_5)_2I$ in one l. of hexane.
1.25 ml. of a solution of 1 mole of $Al(C_2H_5)_3$ in one l. of benzene; the molar rate between $Al(C_2H_5)_2I$ and $Al(C_2H_5)_3$ is 13.6.
200 ml. of dry benzene
2.990 g. of the previously prepared catalytic complex
100 ml. of dry benzene.

The reaction medium is stirred and heated to 50° C. Then, 100 ml. of butadiene are added. The system is maintained at 50° C. for 3 hours. Then, it is cooled and the polymer is coagulated in methyl alcohol.

The polymer is filtered and the insoluble fraction is submitted to steam distillation until all of the solvent has been eliminated. The product is dried under vacuum at 60° C. until its weight remains constant.

48.5 g. of polybutadiene are thus recovered. The conversion rate is 71%. The activity if 3,500 g. of polymer per hour and per g. of transition metal.

The recovered polymer contains 72% of cis double bonds, 20% of trans double bonds and 8% of vinyl double bonds as determined by infrared spectrometry.

EXAMPLE 4

A catalytic complex is prepared from magnesium oxide and $TiCl_4$ in the same manner as described in Example 3. The magnesium oxide is obtained by heating magnesium hydroxycarbonate under a current of nitrogen at 540° C. The recovered product has the following composition:

| | G./kg. |
|---|---|
| Ti | 13 |
| Cl | 147 |
| Mg | 494 |

Butadiene is polymerized as in Example 1 with 0.681 g. of the catalytic complex 0.034 mole of $Al(C_2H_5)_2I$ and 0.0025 mole of $Al(C_2H_5)_3$.

30.0 g. of polybutadiene are recovered. The conversion rate is 48%. The catalytic activity is 1,130 g. of polymer per hour and per g. of Ti.

The infrared spectrometric analysis of the polymer shows that it contains:

63% of 1,4-cis units;
30% of 1,4 trans units and
6% of 1,2 units.

EXAMPLES 5–10

These examples are carried out as in Example 3; 10 g. of $Mg(OC_2H_5)_2$ react with 50 ml. of $TiCl_4$. The product is washed with hexane until all traces of chlorine have disappeared in the washing solvent. Then, the solid is dried under vacuum until its weight remains constant.

The elemental analysis of the recovered solid gives the following results:

| | G./kg. |
|---|---|
| Ti | 38 |
| Cl | 559 |
| Mg | 174 |
| C | 174 |
| H | 28 |

With the catalytic solid, a series of polymerization reactions are conducted as in Example 3 (temperature: 50° C.; length of time: 3 hours).

The results of these polymerizations and the characteristics of the polymers are given in Table 1.

TABLE 1

| Example | 5 [1] | 6 [2] | 7 [3] | 8 [3] | 9 [3] | 10 [4] |
|---|---|---|---|---|---|---|
| Polymerization conditions: | | | | | | |
| Amount of catalyic solid, grams | 0.258 | 0.263 | 0.275 | 0.251 | 0.255 | 0.244 |
| Amount of $Al(C_2H_5)_2I$, mol. grams | | | 0.010 | 0.002 | 0.034 | 0.034 |
| Amount of $Al(C_2H_5)_3$, mol. grams | 0.004 | 0.004 | | 0.002 | 0.0025 | 0.0025 |
| Molar ratio $Al(C_2H_5)_2I/Al(C_2H_5)_3$ | 0 | 0 | | 1 | 13.6 | 13.6 |
| Atomic ratio of Al/Ti | 19.5 | 19.3 | 46 | 20 | 180 | 189 |
| Results: | | | | | | |
| Weight of polymer, grams | 51 | 20.4 | 12.9 | 12.8 | 45.9 | 42 |
| Conversion rate, percent | 23.3 | 30 | 20.7 | 20.4 | 73.0 | 67 |
| Activity, grams of polymer/ h. and g. of catalytic solid | 2,600 | 1,040 | 410 | 448 | 1,580 | 1,500 |
| Structure of the polymer: | | | | | | |
| Cis-1,4 units, percent | 9 | 2 | 74 | 69 | 61 | 60 |
| Trans-1,4 units, percent | 89 | 97 | 21 | 23 | 30 | 35 |
| 1,2 units, percent | 2 | 1 | 6 | 7 | 8 | 5 |

[1] Solvent: none; butadiene: 350 ml.; duration, 2 hours.
[2] Solvent: hexane, 400 ml.; butadiene: 100 ml.; duration, 2 hours.
[3] Solvent: benzene, 300 ml.; butadiene 100 ml.; duration, 3 hours.
[4] Solvent: none; butadiene, 400 ml.; duration, 3 hours.

As may be seen the stereochemistry of the recovered product depends greatly on what kind of activator is used (trialkylaluminum, dialkylaluminum iodide or a mixture of both).

To obtain a polymer with a 1,4-trans structure, trialkylaluminum, must be used alone. To manufacture polymers with a 1,4-cis structure, a mixture of a trialkylaluminum and a dialkylaluminum iodide with a great excess of the later gives the best results.

EXAMPLE 11

Under the same conditions as in Example 1, 25 ml. of $TiCl_4$ are reacted with 5 g. of a copolymer of vinyl chloride and vinyl acetate which is partially hydrolyzed. Such polymers are sold under the name "Vinylite Vagh." A catalytic solid is recovered which contains 65.5 g. of Ti per kg.

Following the method used in Example 1, butadiene is polymerized by means of 312.1 mg. of diethylaluminum chloride as activator and 376 mg. of the catalytic solid.

EXAMPLE 12

Cobalt acetylacetonate $Co(C_5H_7O_2)_2$ in an amount of 2 g. is dissolved in 500 ml. of $CHCl_3$. This solution is added gradually to a suspension of 6 g. of magnesium ethylate in 200 ml. of $CHCl_3$. The suspension is heated boiling under a nitrogen atmosphere in 1 l. round bottom flask on which is mounted a reflux cooling device. The suspension is maintained at reflux for two hours with stirring. Then it is cooled, while still under an atmosphere of nitrogen.

The suspension is filtered on sintered glass, washed ten times with $CHCl_3$ and dried under vacuum for 16 hours.

The recovered product has the following composition:

| | G./kg. |
|---|---|
| Co | 98 |
| Mg | 111 |
| C | 392 |
| H | 102 |

To carry out a polymerization reaction for butadiene, an autoclave of 1.5 l. swept with dry nitrogen is successively supplied with:

25 ml. of a molar solution of $Al(C_2H_5)Cl$ in hexane
175 ml. of benzene 0.398 g. of the catalytic complex prepared as described just above
75 ml. of benzene saturated with water, that is containing 636 mg. of water per l.; this corresponds to a $Al/H_2O$ rate of 10.

After stirring and cooling to 10° C., 100 ml. of butadiene are added. The system is maintained at 10° C. for two hours. Then, the reaction medium is degassed and the polymer is coagulated with methyl alcohol. After filtration, the undissolved fraction is submitted to a steam distillation until the solvent is eliminated. The product is dried under vacuum till the weight remains constant.

31.1 g. of polybutadiene are recovered. The conversion rate is 49%. The activity of the catalyst is 398 g. of polymer per hour and g. of cobalt.

The infrared spectrometric analysis shows that the product contains:

94% of cis double bonds
4% of trans double bonds
2% of vinyl double bonds

EXAMPLES 13–17

(a) preparation of poly-4-vinylpyridine 4-vinylpyridine is polymerized in presence of benzoylperoxide in toluene at 60° C. The recovered product is purified by disolution in chloroform and reprecipitation with n-heptane.

Its intrinsic viscosity measured in chloroform at 25° C. is 0.028 l./g.

(b) Preparation of the complex cobalt chloride-poly-4-vinylpyridine

On a round bottom flask of 0.5 l. is mounted a tube provided with a sintered plate as its bottom and a cooling device as its top is used.

The round bottom flask is supplied with:

1.6 g. of polyvinylpyridine
150 ml. of $CHCl_3$

And then above the sintered plate is placed:

2.685 g. of anhydrous $CoCl_2$ dried under vacuum at 150° C. during 48 hours.

The flask is alternatively heated and cooled to extract $CoCl_2$ with the chloroform. After 10 of such operations, it is cooled. The complex precipitates in the form of a light blue solid. It is filtrated on a sintered glass plate then washed with pure chloroform and dried under vacuum.

The recovered product has the following compositions:

| | G./kg. |
|---|---|
| Co | 169 |
| Cl | 205 |
| C | 402 |
| H | 37 |
| N | 60 |

This corresponds to a N/Co rate of 1.7.

(c) Polymerization reaction

TABLE II

| Example | 13 | 14 | 15 | 16 | 71 |
|---|---|---|---|---|---|
| Temperature, °C | 50 | 10 | 10 | 10 | 10 |
| Period of time, minutes | 30 | 30 | 60 | 60 | 240 |
| Amount of complex, mg | 49 | 51 | 51 | 49 | 51 |
| Amount of $Al(C_2H_5)_2Cl$ mol. grams | 30 | 30 | 30 | 30 | 30 |
| Al/Co ratio | 213 | 205 | 204 | 211 | 207 |
| Solvent: | | | | | |
| Nature | (1) | (1) | (1) | (2) | (1) |
| Amount, ml | 300 | 300 | 300 | 200+100 | 300 |
| Butadiene; amount, ml | 100 | 100 | 100 | 100 | 100 |
| Water, mol. grams | 3 | 3 | 3 | 3 | ------- |
| Results: | | | | | |
| Weight of polymer, grams | 50.6 | 46.4 | 48 | 59.1 | 55.5 |
| Conversion rate, percent | 80 | 74 | 77 | 92 | 86 |
| Activity of catalyst grams of polymer/grams of Co and per hour | 12,200 | 10,750 | 5,560 | 7,120 | 1,610 |
| Stereochemistry of the polymer cis-1,4, percent | 86 | 86 | 89 | 86 | 90 |
| Trans-1,4, percent | 13 | 13 | 10 | 12 | 6 |
| 1,2, percent | 1 | 1 | 1 | 2 | 4 |

[1] Benzene; [2] Benzene plus hexane.

EXAMPLE 18

A complex poly-4-vinylpyridine-nickel chloride is prepared in the same apparatus as described in Examples 13 to 17 paragraph (b). Under nitrogen current, 1.5 g. of poly-4-vinylpyridine and 300 ml. of methanol are introduced in the flask and 1.0 g. of $NiCl_2$ on the sintered glass plate. $NiCl_2$ is extracted with hot methanol. Then the precipitated complex is separated.

The complex is transferred in another tube fitted with a sintered plate and washed with hot methanol till the solvent is free of any coloration. After that, the complex is washed with hexane and dried until its weight remains constant.

The recovered complex has the following composition:

| | G./kg. |
|---|---|
| Ni | 117 |
| Cl | 130 |
| H | 59 |

A polymerization reaction is conducted such as in Example 12 by means of:

73 mg. of the complex
30 ml. of a molar solution of $Al(C_2H_5)_2$ in hexane; this this corresponds to a Al/Ni rate of 206
215 ml. of dry benzene
85 ml. of benzene containing 636 mg. of water per liter
100 ml. of butadiene.

After three hours of polymerization at 25° C., 9.4 g. of polybutadiene are recovered. The conversion rate is 15% and the activity of the catalyst is 363 g. of polybutadiene per hour and g. of Ni.

The infrared spectrometric analysis shows that the polymer contains:

92% of cis double bonds
4% of trans double bonds
4% of vinyl double bonds.

What we claim is:

1. Process for the polymerization of butadiene which comprises carrying out said polymerization in an anhydrous medium in the presence of a catalyst constituted by an activator selected from the group consisting of alkylaluminum iodide and a mixture of alkylaluminum iodide and trialkylaluminum the ratio of said alkylaluminum iodide to said trialkylaluminum in said mixture being between 2 and 100, and a catalytic complex obtained by reacting a compound of a transition metal selected from the group consisting of the halides and acetylacetonates of a metal of Groups IV*b*, V*b* and VI*b* of the Periodic Table with a solid support selected from the group consisting of polyvinylpyridine and the hydrated phosphates, hydroxylated phosphates, hydroxychlorides, hydroxides, partially hydroxylated halides, carbonates, sulphates, nitrates, silicates, carboxylic acid salts and alcoholates of magnesium, calcium, zinc, tin, manganese and iron, whereby polymers having a content of cis-1,4 units of 60% or more are obtained.

2. Procedure according to claim 1 in which the molar ratio of alkylaluminum iodide to trialkylaluminum in the activating mixture is between about 5 and 20.

3. Process according to claim 1 in which the transition metal compound is titanium tetrachloride, the trialkylaluminum is triethylaluminum and the alkylaluminum iodide is the monoiodide of ethylaluminum.

4. Process according to claim 1 in whic hthe transition metal is titanium.

References Cited

UNITED STATES PATENTS

| | | | |
|---|---|---|---|
| 3,066,123 | 11/1962 | Strohmayer et al. | 260—93.1 |
| 3,281,375 | 10/1966 | Vandenberg | 252—429 |
| 3,285,891 | 11/1966 | Aftandilian | 260—85.3 |
| 3,326,877 | 6/1967 | Orzechowski et al. | 260—93.7 |
| 3,328,378 | 6/1967 | Piekarski et al. | 260—94.9 |
| 3,172,881 | 3/1965 | Farrar et al. | 260—94.3 |
| 3,214,417 | 10/1965 | Bloyaert et al. | 260—88.2 |
| 3,341,617 | 9/1967 | Schleimer et al. | 260—680 |
| 3,400,110 | 9/1968 | Dassesse et al. | 260—88.2 |
| 3,454,547 | 7/1969 | Delbouille et al. | 260—94.9 |
| 3,328,376 | 6/1967 | Bernemann et al. | 260—94.3 |

JOSEPH L. SCHOFER, Primary Examiner

R. A. GAITHER, Assistant Examiner

U.S. Cl. X.R.

260—82.1, 85.3